(12) United States Patent
Hsu et al.

(10) Patent No.: US 9,014,872 B2
(45) Date of Patent: Apr. 21, 2015

(54) NAVIGATION ENVIRONMENT ESTABLISHING METHOD FOR AN INTELLIGENT MOVING-ASSISTANCE APPARATUS

(71) Applicant: Yuan Ze University, Taoyuan County (TW)

(72) Inventors: Yeh-Liang Hsu, Taoyuan County (TW); Ju-An Wang, New Taipei (TW); Po-Er Hsu, Taipei (TW)

(73) Assignee: Yuan Ze University, Taoyuan County (TW)

( * ) Notice: Subject to any disclaimer, the term of this patent is extended or adjusted under 35 U.S.C. 154(b) by 26 days.

(21) Appl. No.: 14/022,196

(22) Filed: Sep. 9, 2013

(65) Prior Publication Data

US 2014/0336843 A1 Nov. 13, 2014

(30) Foreign Application Priority Data

May 10, 2013 (TW) .............................. 102116769 A

(51) Int. Cl.
*A61G 5/10* (2006.01)
*G01C 21/00* (2006.01)
*G01C 21/20* (2006.01)
*G06F 17/30* (2006.01)

(52) U.S. Cl.
CPC ..................................... *G01C 21/206* (2013.01)

(58) Field of Classification Search
USPC ..................... 701/1, 409, 428, 433, 434, 454; 340/572.1
See application file for complete search history.

(56) References Cited

U.S. PATENT DOCUMENTS

| | | | |
|---|---|---|---|
| 8,019,352 B2 * | 9/2011 | Rappaport et al. .......... | 455/456.1 |
| 8,825,387 B2 * | 9/2014 | Mays et al. ................... | 701/433 |
| 2006/0149465 A1 * | 7/2006 | Park et al. ..................... | 701/209 |
| 2007/0219711 A1 * | 9/2007 | Kaldewey et al. ............ | 701/208 |
| 2009/0267768 A1 * | 10/2009 | Fujiwara et al. ........... | 340/572.1 |
| 2009/0325595 A1 * | 12/2009 | Farris ......................... | 455/456.1 |

FOREIGN PATENT DOCUMENTS

| | | |
|---|---|---|
| JP | 2008250801 A | 10/2008 |
| TW | M245962 | 10/2004 |
| TW | M395885 U1 | 1/2011 |
| TW | 201207786 A1 | 2/2012 |
| TW | 201238581 A1 | 10/2012 |
| WO | WO2005/086120 A1 | 9/2005 |

* cited by examiner

*Primary Examiner* — Tan Q Nguyen
(74) *Attorney, Agent, or Firm* — Li & Cai Intellectual Property (USA) Office

(57) ABSTRACT

A navigation environment establishing method for an intelligent moving-assistance apparatus moving in a movement area having a plurality of regions includes steps of: a navigation map is set, and the content of the navigation map including the relative locality of the regions. A current data indicating a current region is set. At least one target data indicating an available target region is set. Then, a navigation data is generated. The content of the navigation data includes the current region and a first target region, wherein the region where the intelligent moving-assistance apparatus first arrive when moving from the current region to the first target region according to a predetermined path is in a first direction with respect to the current region. Subsequently, the navigation data is recorded into an image identification tag. Finally, the image identification tag is placed in the current region.

17 Claims, 17 Drawing Sheets

NAVIGATION ENVIRONMENT ESTABLISHING METHOD FOR AN INTELLIGENT MOVING-ASSISTANCE APPARATUS

BACKGROUND

1. Field of the Invention

The instant disclosure relates to navigation environment establishing method, and pertains particularly to a navigation environment establishing method for an intelligent moving-assistance apparatus.

2. Description of Related Art

With the development of technology, more and more home or environmental systems and devices are designed to introduce automation and intelligent control technology. Among them, the intelligent moving-assistance systems and apparatus utilize automation and intelligent control technologies to help users, such as the elderly.

Furthermore, positioning systems and devices are widely used in intelligent transportation systems, and mobile devices. The receiver of positioning systems and devices can obtain information including three-dimensional position, velocity and time via the wireless transmission to derive the navigation information and perform complicated calculation to plan the movement path based on the electronic map to guide the user to the destination. However, when the wireless transmission signal is weak, in order to determine the position of the receiver, the receiver must be sufficiently sensitive to weak signals in order to obtain and interpret the information received. In addition, the barriers in the environment may disturb the signal transmission. Hence, the wireless transmission signal is weak in an indoor environment, an urban environment or an outdoor environment having obstacles such as plants.

SUMMARY OF THE INVENTION

The embodiment of the instant disclosure provides a navigation environment establishing method for an intelligent moving-assistance apparatus moving in a movement area having a plurality of regions. The navigation environment establishing method includes steps of: a navigation map is set, and the content of the navigation map including the relative locality of the regions with respect to one another. A current data indicating a current region is set, and the current region is one of the regions where the intelligent moving-assistance apparatus currently is. At least one target data indicating an available target region is set, and the available target region is one of the regions where the intelligent moving-assistance apparatus is able to move to. Then, a navigation data is generated according to the navigation map, the current data, and the target data. The content of the navigation data includes the current region and a first target region, which is one of the regions, wherein the region where the intelligent moving-assistance apparatus first arrive when moving from the current region to the first target region according to a predetermined path is in a first direction with respect to the current region. Subsequently, the navigation data is recorded into an image identification tag. Finally, the image identification tag is placed in the current region.

According to one exemplary embodiment of the instant disclosure, an intelligent moving-assistance apparatus is provided, which includes a mobile device, a photographic unit, and a control unit. The mobile device is for carrying a user. The photographic unit is disposed on the mobile device for capturing the image identification tags. The control unit is disposed on the mobile device. The control unit, according to the content of the image identification tag currently captured by the photographic unit, identifies the current region, where the intelligent moving-assistance apparatus currently is, and determines an intermediate target region, where the intelligent moving-assistance apparatus first arrive according to a predetermined path to reach a target region, to control the mobile device to move to the immediate target region.

In order to further understand the instant disclosure, the following embodiments are provided along with illustrations to facilitate the appreciation of the instant disclosure; however, the appended drawings are merely provided for reference and illustration, without any intention to be used for limiting the scope of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
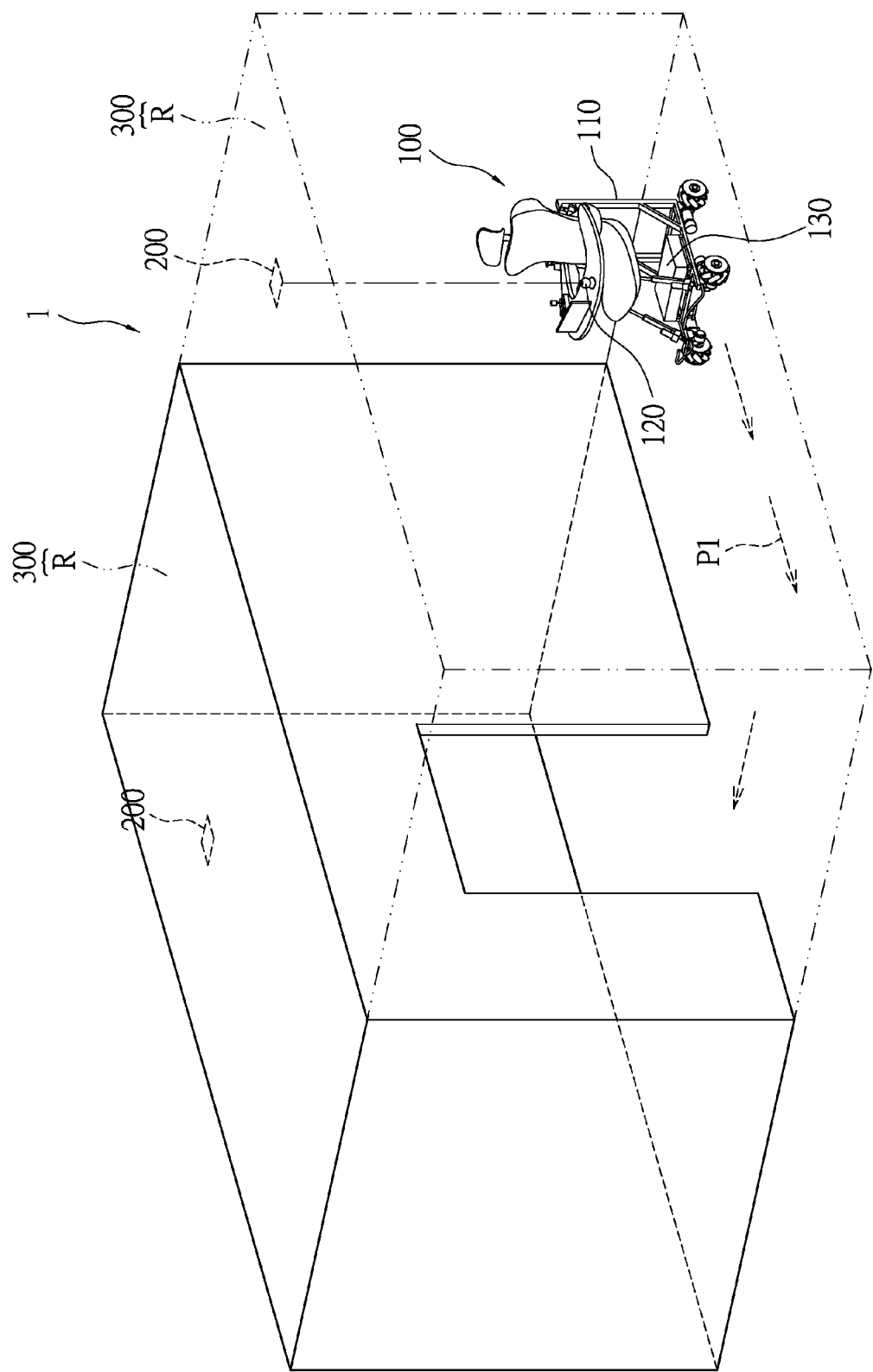
FIG. 1 is a schematic view illustrating an intelligent moving-assistance system in accordance with an embodiment of the present disclosure.
Figure 2A:
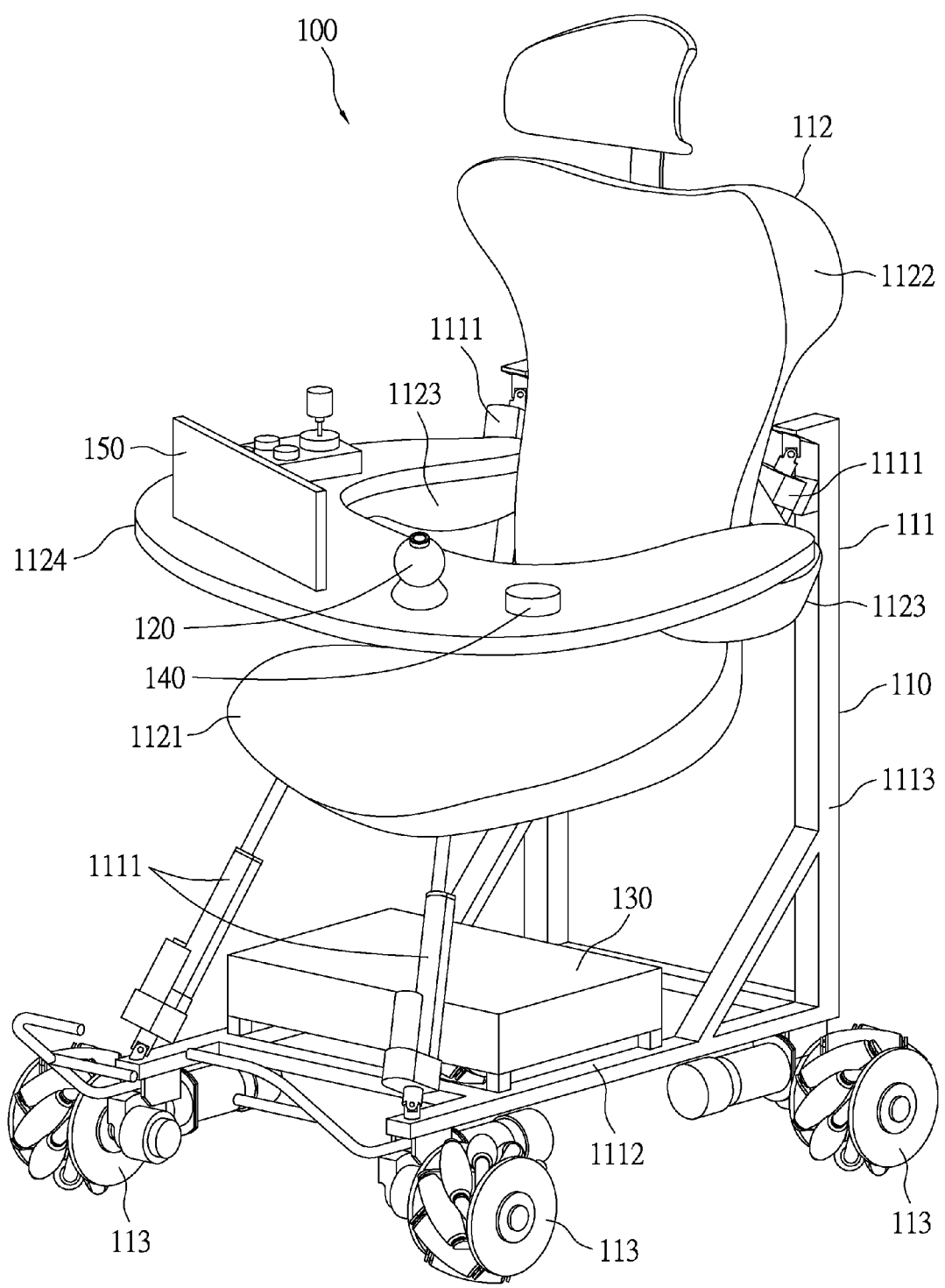
FIG. 2A is a schematic view illustrating an intelligent moving-assistance apparatus in accordance with an embodiment of the present disclosure.

Please refer concurrently to FIG. 1, and FIG. 2A. FIG. 1 is a schematic view illustrating an intelligent moving-assistance system in accordance with an embodiment of the present disclosure, and FIG. 2A is a schematic view illustrating an intelligent moving-assistance apparatus in accordance with an embodiment of the present disclosure. An intelligent moving-assistance system 1 includes an intelligent moving-assistance apparatus 100 and a plurality of image identification tags 200 placed in a movement area 300 of the intelligent moving-assistance apparatus 100.

As shown in the FIG. 1 in the instant disclosure, the movement area of the intelligent moving-assistance apparatus 100 includes two regions, which are rooms R communicated to each other, and the image identification tags 200 are placed on the ceilings of the rooms R. Each of the image identification tags 200 is made of paper having a corresponding QR code 210 (Quick Respond Code) printed thereon, and the content of each of the image identification tags 200 includes a plurality of region information. Specifically, a navigation data, the content of which includes the region information corresponding to a current region R, is recorded into the image identification tag 200 in the form of QR code 210 (shown in FIG. 12). In other exemplary embodiment, each of the image identification tags 200 may be arranged in the entrance of the room R or fixed on a wall in the room R, and each of the image identification tags 200 can be made of paper having a corresponding Data Matrix Code printed thereon. In another exemplary embodiment, each of the image identification tags 200 can be formed by printing the corresponding QR code 210 directly on the ceiling of the room R. In addition, the QR code 210 of the image identification tag 200 may be invisible by naked eye or covered. For example, the QR code 210 is printed by fluorescent ink which can glow when irradiated by infrared light, such that the QR code 210 can be captured by infrared photography.

In the instant embodiment, the navigation data corresponding to a current region R can be generated through a navigation environment establishing program installed in an identification tag generating machine (not shown in the Figures). Then, a QR code 210 corresponding to the navigation data can be printed out to form the image identification tag 200. Subsequently, the image identification tag 200 having the QR code 210 can be placed in the corresponding current region R.

In addition, a navigation map including the relative locality of the regions R with respect to one another can be firstly set by the navigation environment establishing machine in the instant disclosure. Specifically, the identification tag generating machine has a map database including geographical maps of movement areas. In other exemplary embodiment, the geographical map can be input by the user. The identification tag generating machine can read the geographical map and generate the navigation map in accordance with the geographical map.

Figure 3:
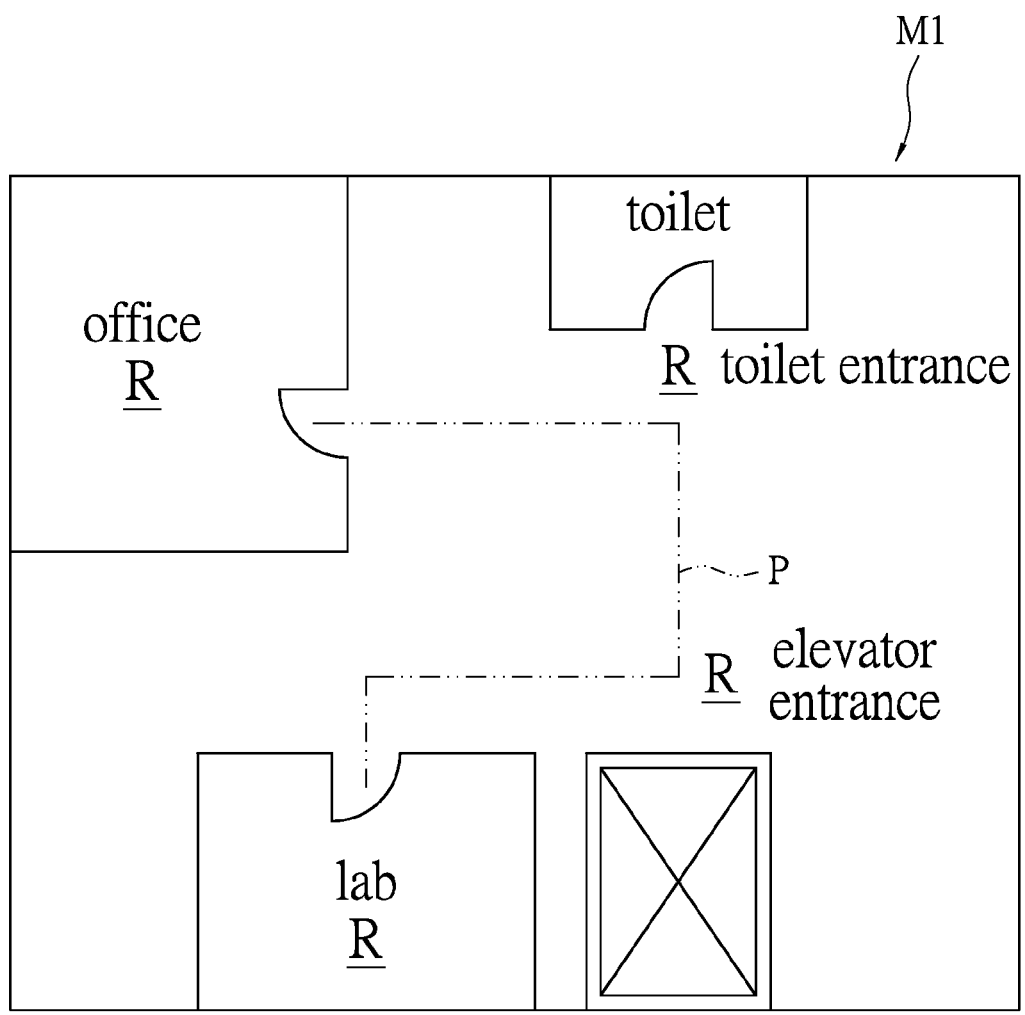
FIG. 3 is a schematic view illustrating a geographic map of a movement area in accordance with an embodiment of the present disclosure.
Figure 4:
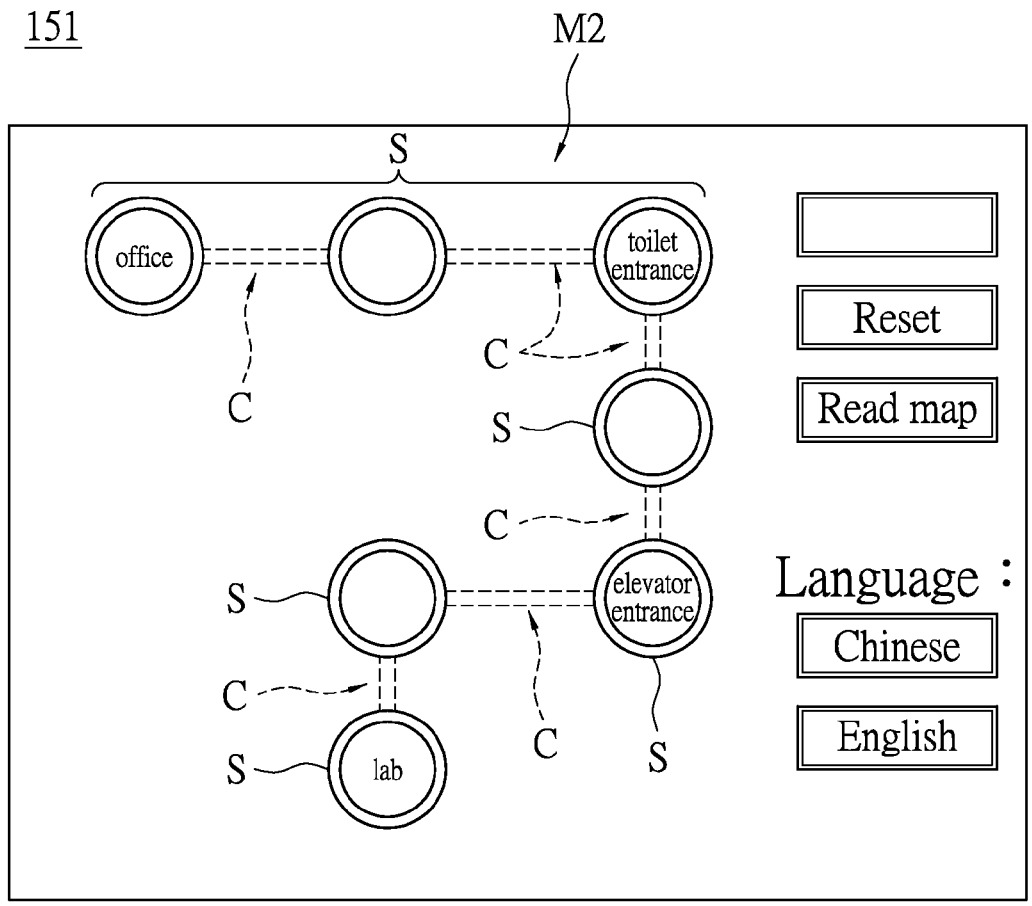
FIG. 4 is a schematic view illustrating a navigation map displayed in a user interface of an intelligent moving-assistance apparatus in accordance with an embodiment of the present disclosure.

Please refer concurrently to FIG. 3, and FIG. 4. FIG. 3 is a schematic view illustrating a geographic map of a movement area in accordance with an embodiment of the present disclosure, and FIG. 4 is a schematic view illustrating a navigation map displayed in a user interface of an intelligent moving-assistance apparatus in accordance with an embodiment of the present disclosure. As shown in the FIG. 3 in the geographic map M1 in an exemplary embodiment, the movement area has a plurality of regions R such as the toilet entrance, the lab, the office, and the elevator entrance, and the regions R are communicated with one another through a passage P. As shown in the FIG. 4, the navigation map M2 includes a plurality of navigation stops S and a plurality of navigation channels C, the navigation stops S respectively indicate the regions R, and the navigation channels C are respectively connected between the neighboring stops S. The navigation map M2 in accordance with a geographical map M1 shows the relative locality of the regions R in the movement area with respect to one another. The content of the navigation map M2 further can includes the name of each of the regions R and whether every two of the neighboring regions R are communicated with each other.

Figure 7:
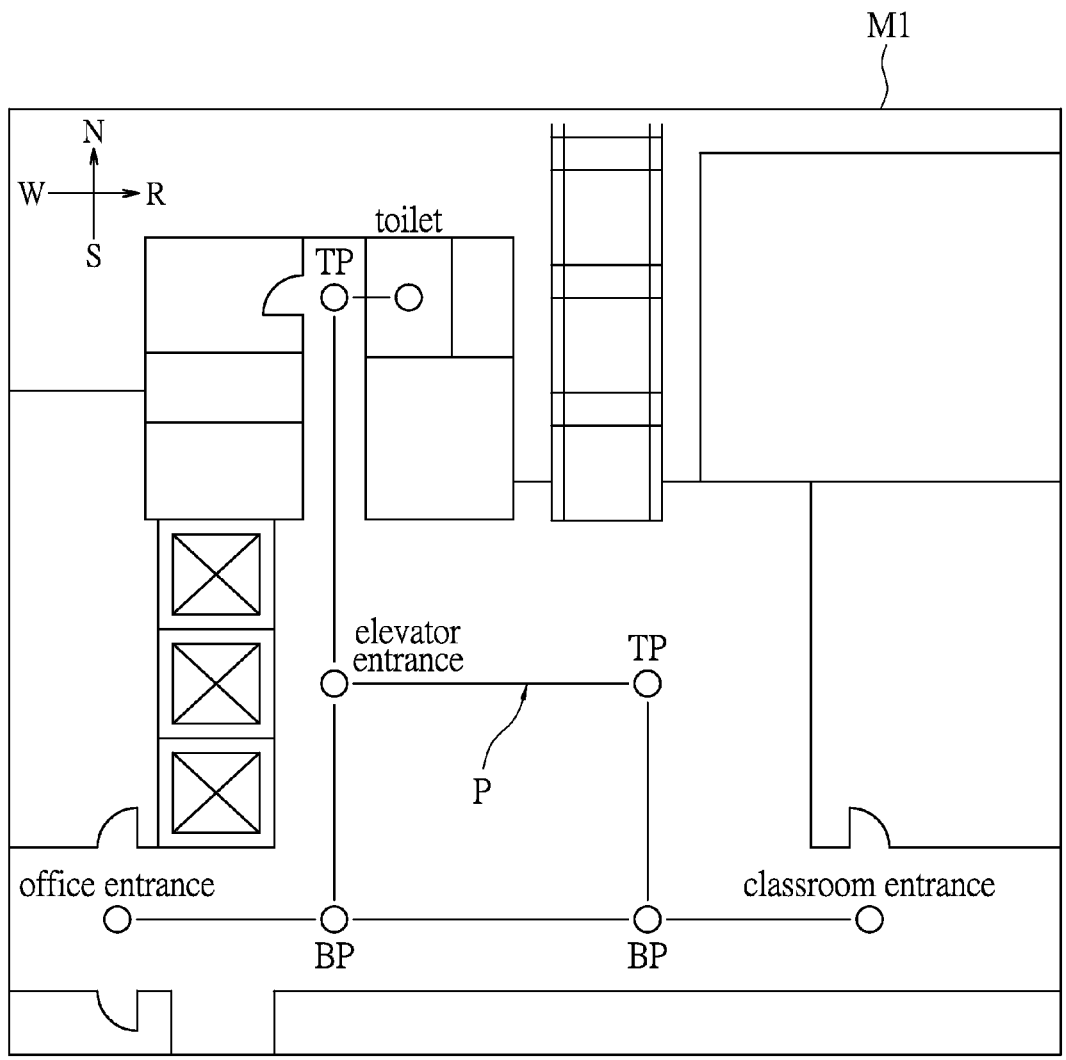
FIG. 7 is a schematic view illustrating a geographic map of a movement area in accordance with another embodiment of the present disclosure.
Figure 8A:
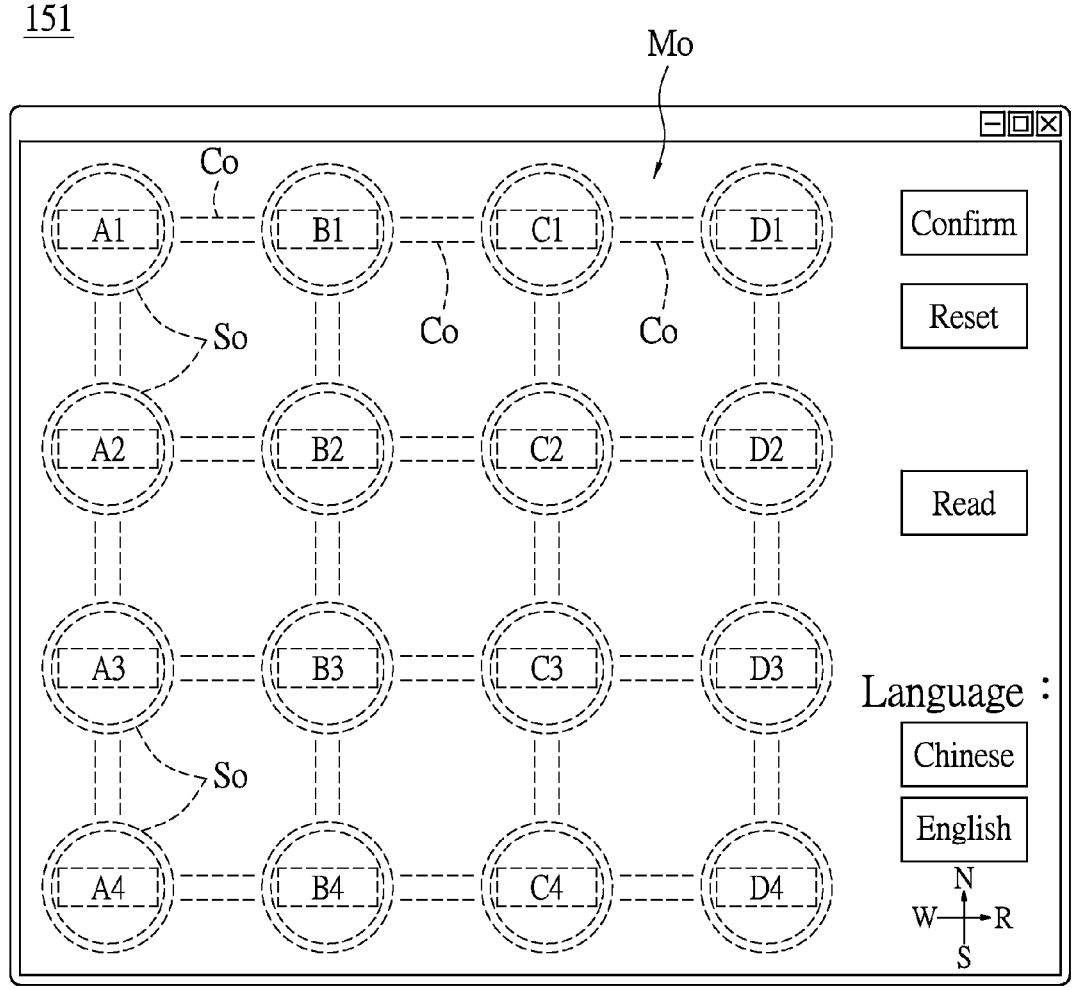
FIG. 8A to FIG. 8C are schematic views illustrating a user interface of an intelligent moving-assistance apparatus for setting the navigation map during one exemplary navigation environment establishing step in accordance with the geographic map shown in FIG. 7.
Figure 8B:
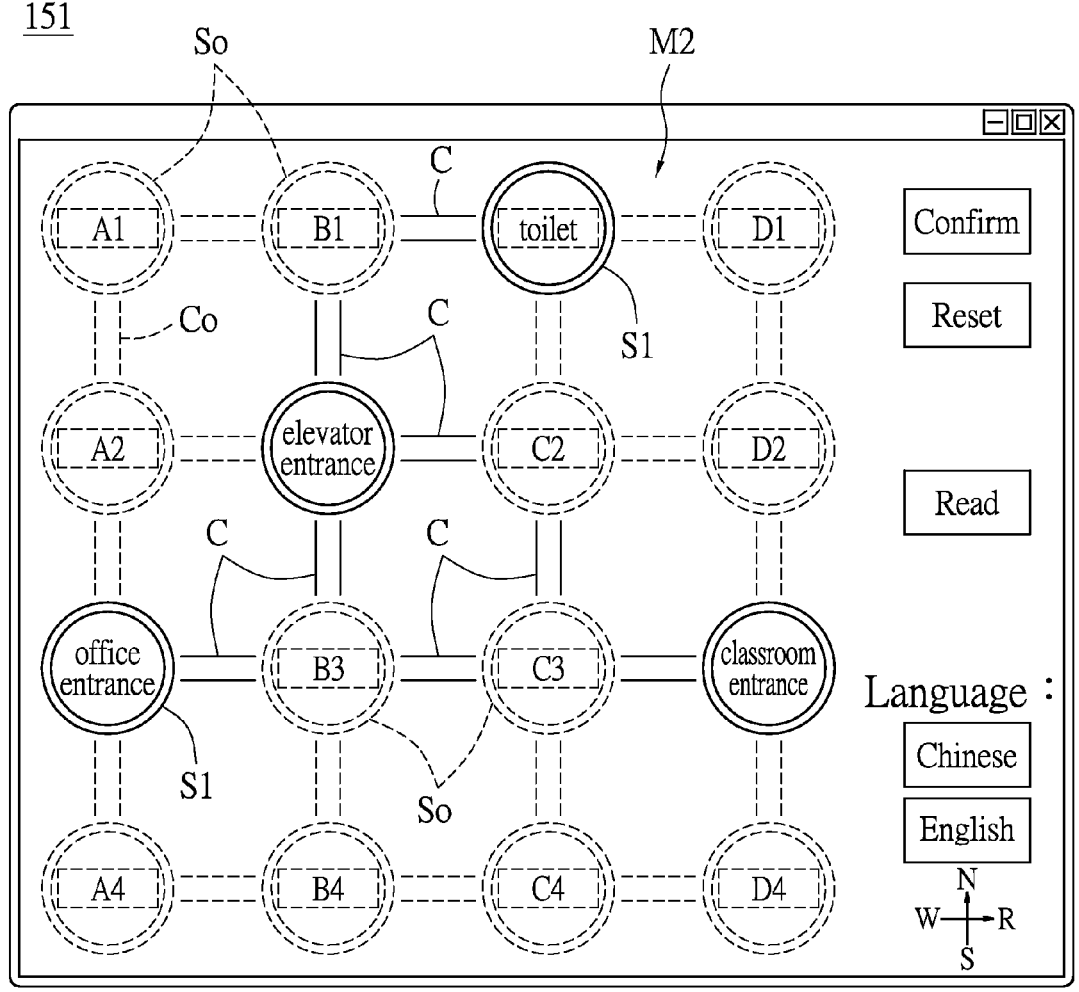
Figure 8C:
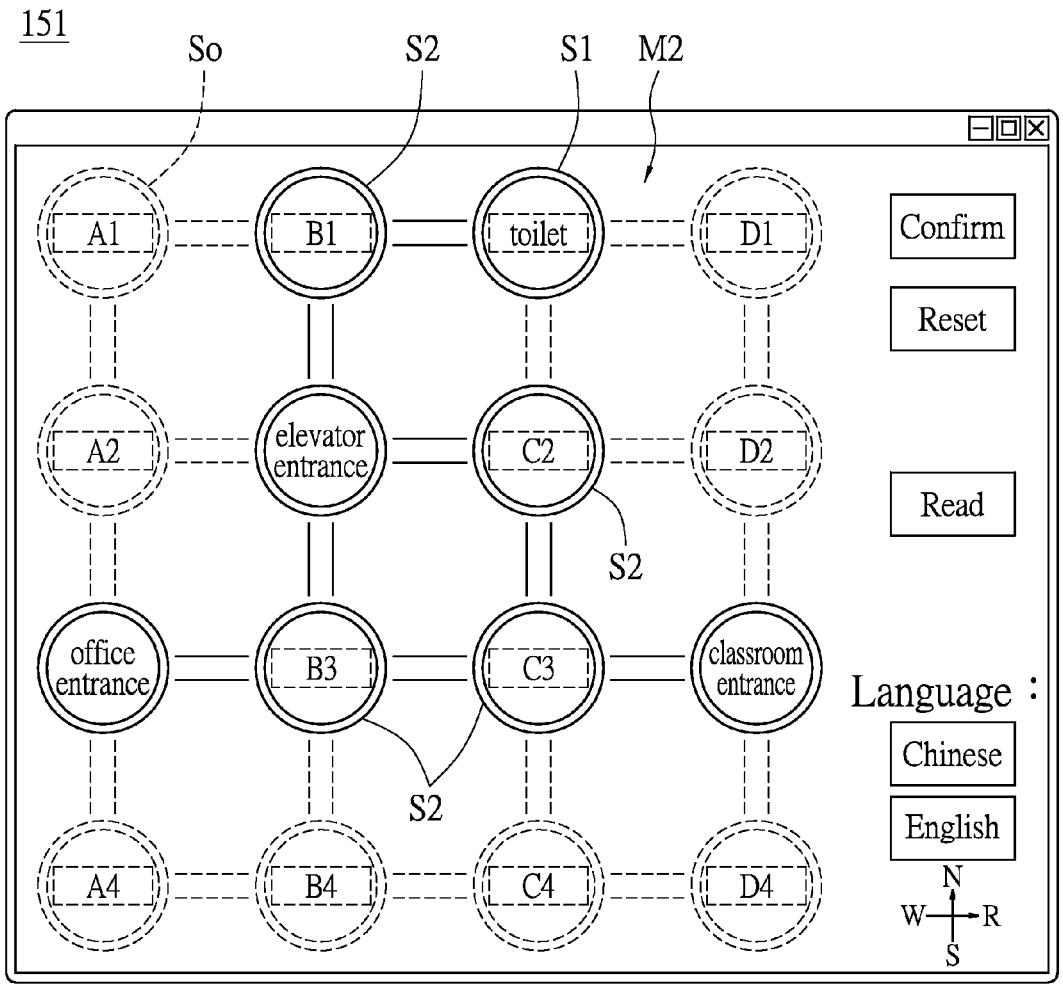

In the instant disclosure, the navigation map M2 can be set through the navigation environment establishing program. The method of setting the navigation map M2 through the navigation environment establishing program is further described hereinafter. Please refer to FIG. 7, and FIG. 8A to FIG. 8C. FIG. 7 is a schematic view illustrating a geographic map of a movement area in accordance with another embodiment of the present disclosure, and FIG. 8A to FIG. 8C are schematic views illustrating a user interface of an intelligent moving-assistance apparatus for setting the navigation map during one exemplary navigation environment establishing step in accordance with the geographic map shown in FIG. 7.

The user can start the navigation environment establishing program through a computer with Windows operation system. As shown in FIG. 8A, after the navigation environment establishing program is started, the user can enter into a user interface 151 having a setting map Mo displayed. The setting map Mo includes a plurality of setting stops S0 (circle patterns with dashed outline) such as A1~A4, B1~B4, C1~C4, D1~D4 and a plurality of setting channels C0 (dashed strip patterns). The setting stops S0 are arranged in a matrix, and the setting channels C0 are respectively connected between the neighboring setting stops S0. The user can click a setting stop S0 so as to set the setting stop S0 clicked as a navigation stop S1. The navigation stops S1 are set in accordance with the relative locality of the regions R with respect to one another in the geographic map M1. The user can further input the information such as the names of the regions R to the navigation stops 51 respectively. In the user interface 151, the setting stops S0 clicked become circle patterns with solid outline. As shown in FIG. 8B, the setting stops S0 A3, B2, C1, and D3 are set as navigation stops S11 respectively named office entrance, elevator entrance, toilet, and classroom entrance.

The user can click a setting channel C0 so as to set the setting channel C0 clicked as a navigation channel C, and to connect two navigation stops S1 with at least one navigation channel C. The navigation channels C are set in accordance with the relative locality of the regions R and the passages P communicating the regions R in the geographic map M1. In the user interface 151, the setting channels C0 clicked become solid strip patterns.

In addition, by the navigation environment establishing program, the setting stops S0 not clicked (circle patterns with dashed outline) while connected to at least one navigation channel C (solid strip patterns) can be set to assistant navigation stops S2 automatically by the computer. As shown in FIG. 8C, the setting stops B1, B3, C2, and C3 are set as assistant navigation stops S2 (circle patterns with solid outline) automatically by the computer. Each of the assistant navigation stops S2 indicates the turning point TP or the branching point BP of the passage P in the geographic map M1.

When setting the navigation map M2 in accordance with a movement area 300, the user can firstly observe the movement area 300 to determine that which regions R in the movement area 300 can be the available target region for the intelligent moving-assistance apparatus 100 for setting the navigation stops S1.

In other embodiment, the user can reset the navigation map M2, select and read the navigation map M2 saved in the computer, switch the language of the user interface 151, and confirm the navigation map M2 set or selected. In addition, the user can select one of the navigation maps M2 saved through the user interface 151, then the navigation environment establishing program can open the data stored in the file to display the navigation map M2 selected through the user interface 151.

It is worth noting that, when setting the navigation stops 51 and navigation channel C in accordance with a movement area 300 to set the navigation map M2, the user can avoid considering the relative distances between two of the regions R with respect to one another.

Figure 9:
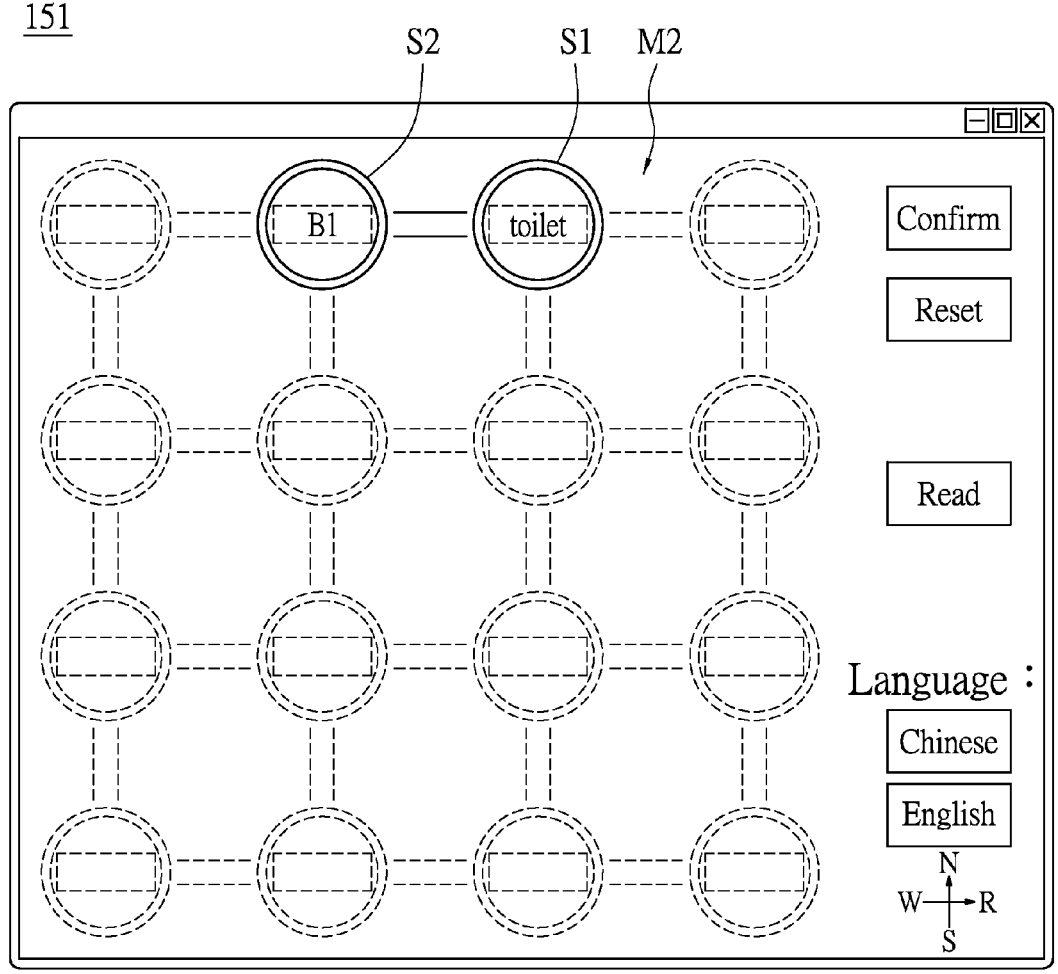
FIG. 9 is a schematic view illustrating a navigation map displayed in a user interface of an intelligent moving-assistance apparatus during one exemplary navigation environment establishing step.
Figure 10:
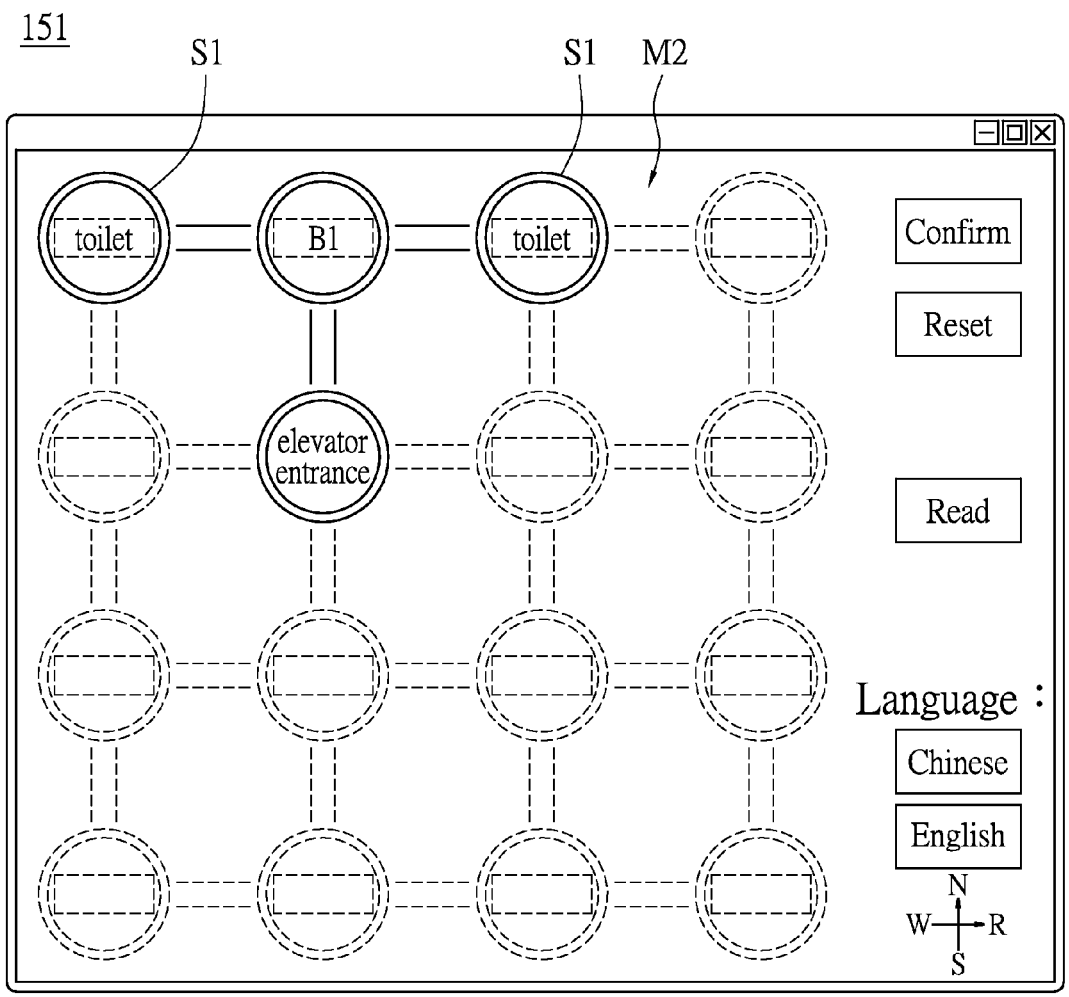
FIG. 10 is a schematic view illustrating a navigation map displayed in a user interface of an intelligent moving-assistance apparatus during one exemplary navigation environment establishing step.
Figure 11:
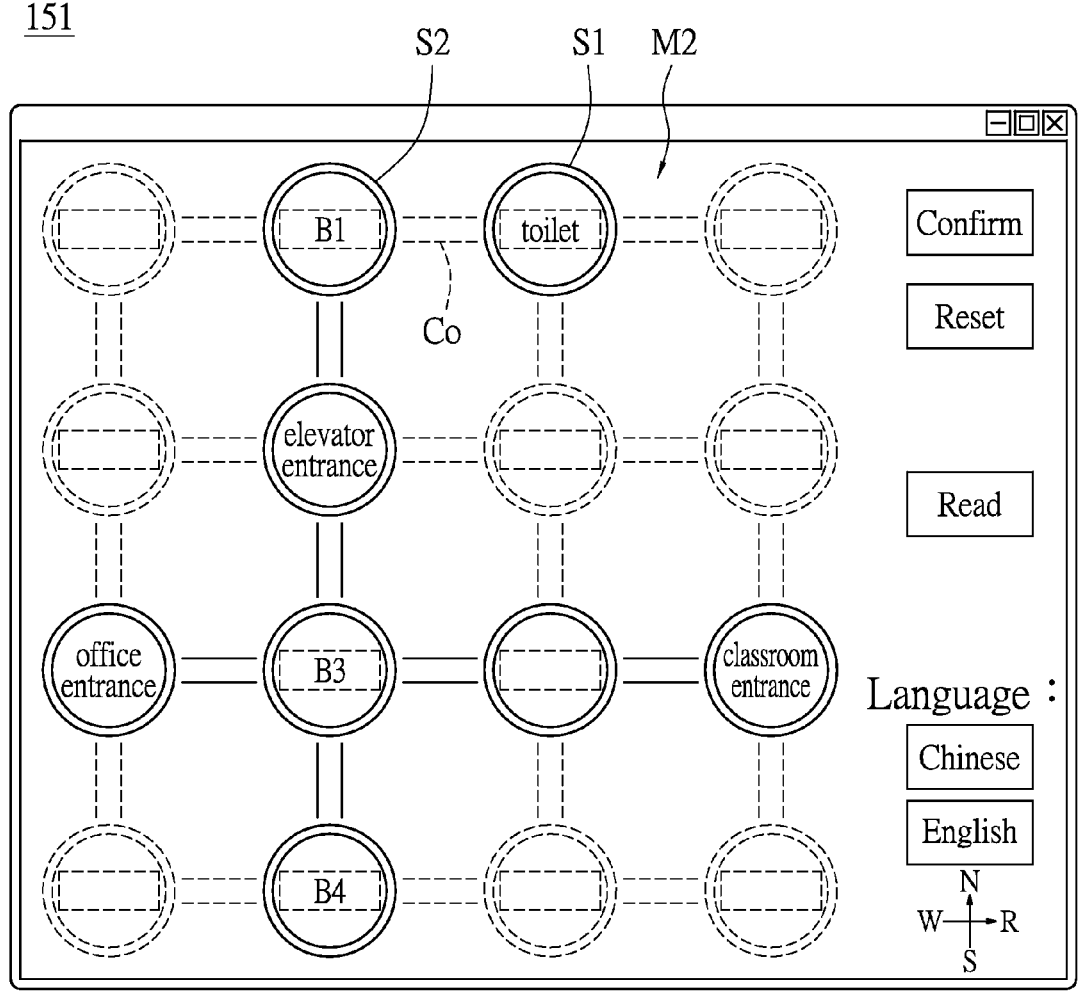
FIG. 11 is a schematic view illustrating a navigation map displayed in a user interface of an intelligent moving-assistance apparatus during one exemplary navigation environment establishing step.

Attention is now invited to FIG. 9, FIG. 10, and FIG. 11, which are respectively schematic views illustrating a navigation map displayed in a user interface of an intelligent moving-assistance apparatus during one exemplary navigation environment establishing step. After the navigation map M2 is set, by the navigation environment establishing program, the user can check if the navigation map M2 has any logic error. Specifically, the user can check whether the navigation map M2 includes more than one navigation stop S1. As shown in FIG. 9, the navigation map M2 includes only one navigation stop S1, and the navigation map M2 can be determined as an error by the navigation environment establishing program. For example, the number of the navigation stops 51 in the navigation map M2 can be calculate by loop control flow, if the calculated result is not greater than 1, the navigation map M2 is determined as an error.

In addition, after the navigation map M2 is set, by the navigation environment establishing program, the user can check whether the navigation map M2 includes more than one stop S (navigation stop S1 or assistant navigation stop S2) indicating the same region R. For example, the user can check if the navigation map M2 includes stops S named the same by loop iteration control flow. As shown in FIG. 10, there are two navigation stops 51 named the same, which are named toilet, and the navigation map M2 can be determined as an error by the navigation environment establishing program.

Furthermore, after the navigation map M2 is set, by the navigation environment establishing program, the user can check whether each of the stops S is connected to at least one of the rest of the stops S. Specifically, the user can determine whether the distance between two of the stops S is measured infinite by computing with Dijkstra shortest path algorithm. The distance between two of the stops S which are not connected to each other is measured infinite. As shown in FIG. 11, the stop S named toilet is not connected to at least one of the rest of the stops S, and the distance between the stop S named toilet and each of the rest stops S is measured infinite by computing with Dijkstra shortest path algorithm. Hence, the navigation map M2 can be determined as an error by the navigation environment establishing program.

After completing the setting of the navigation map M2, the navigation map M2 can be confirmed and saved through the user interface 151. The content of the navigation map M2 includes the relative locality of the stops S (the navigation stops S1 and the assistant navigation stops S2) with respect to one another, the names of the stops S, and whether two of the stops S are connected to each other.

Figure 12:
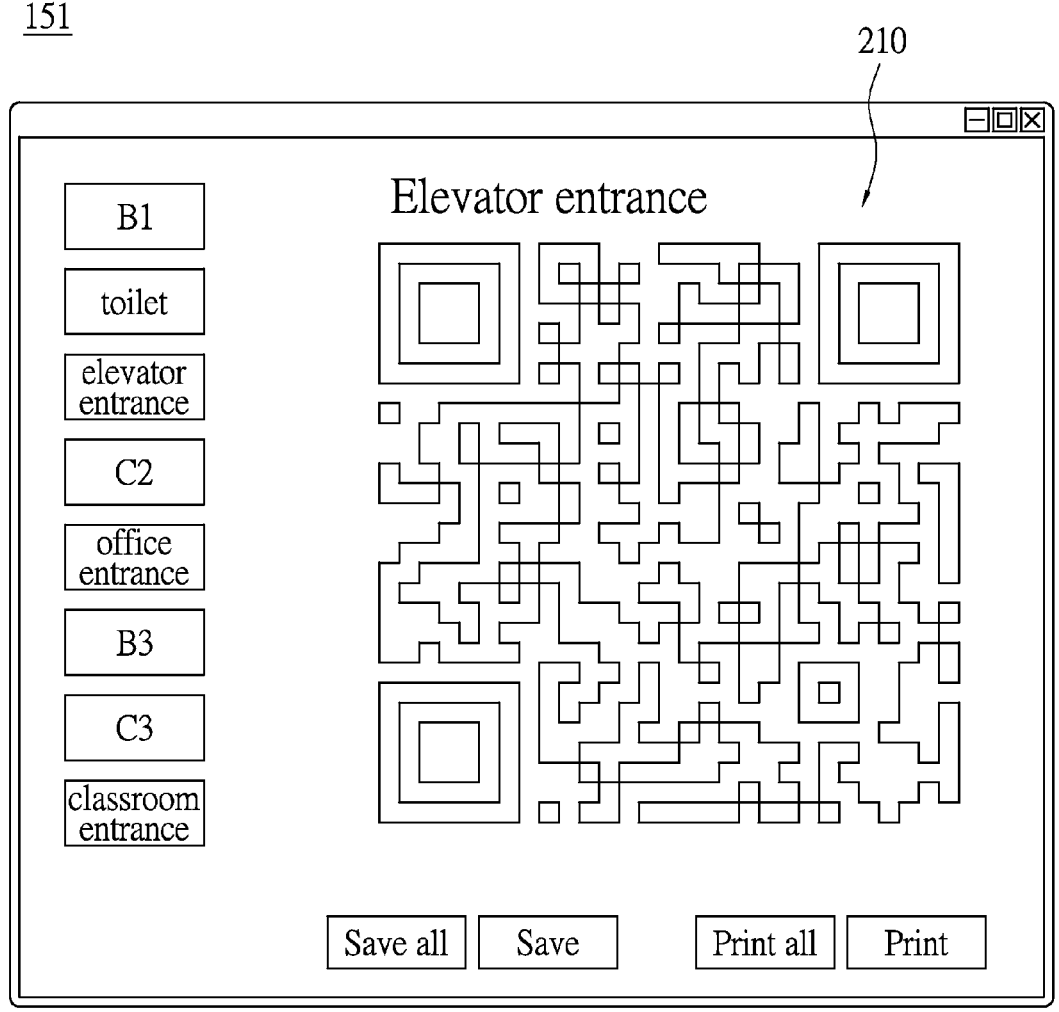
FIG. 12 is a schematic view illustrating a QR code displayed in a user interface of an intelligent moving-assistance apparatus in accordance with an embodiment of the present disclosure.

Consequently, a current data indicating a current region R can be set. The current region is one of the regions R where the intelligent moving-assistance apparatus 100 currently is. Then, a target data indicating an available target region R can be set. The available target region is one of the regions R where the intelligent moving-assistance apparatus 100 is able to move to. Then, a navigation data can be generated according to the navigation map M2, the current data and the target data. In the instant disclosure, the navigation data can be generated through the navigation environment establishing program. The method of generating the navigation data through the navigation environment establishing program is further described hereinafter. Please refer to FIG. 12, which is a schematic view illustrating a QR code displayed in a user interface of an intelligent moving-assistance apparatus in accordance with an embodiment of the present disclosure. As shown in FIG. 12, after the navigation map M2 is set or selected from the stored data, the user can enter into a user interface 151 for generating navigation data, which is in the form of a QR code 210. By selecting one of the bottoms corresponding to navigation stops S1 and assistant navigation stops S2 in the navigation map M2 on the user interface 151, a corresponding QR code 210 can be generated by the navigation environment establishing program.

By the navigation environment establishing method for an intelligent moving-assistance apparatus 100 in the instant disclosure, according to the content of the image identification tag 200 placed in a current region, where the intelligent moving-assistance apparatus 100 currently is, the intelligent moving-assistance apparatus 100 can identify the current region and determine the initial moving direction to a target region. An initial moving direction from a current region to a target region is the relative direction of an intermediate target region, where the intelligent moving-assistance apparatus 100 first arrive according to a predetermined path from the current region R to reach the target region, with respect to the current region.

Hence, the intelligent moving-assistance apparatus 100 can be guided and move in the initial moving direction to reach the intermediate target. Therefore, the intelligent moving-assistance apparatus 100 can be sequentially guided and move to every region R along the predetermined path to finally reach the target region.

Figure 13:
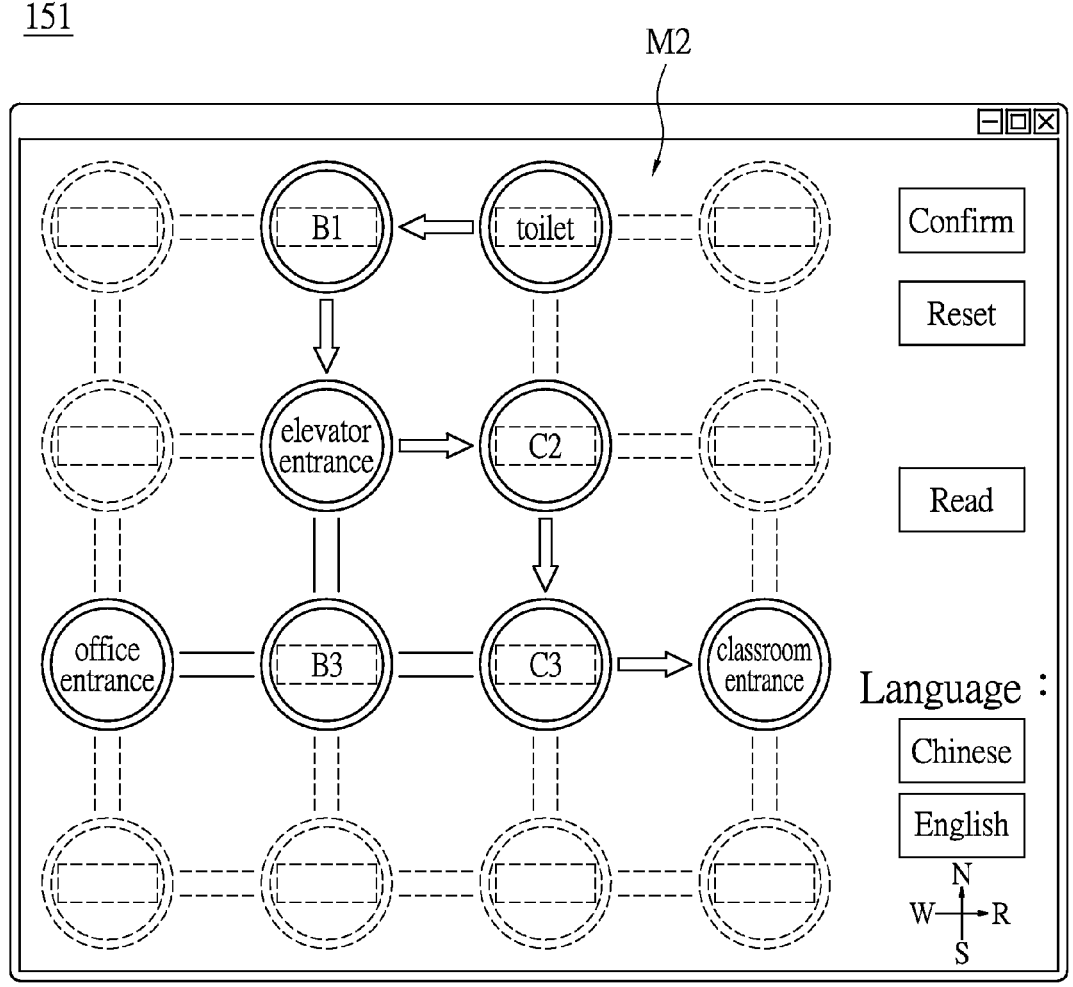
FIG. 13 is a schematic view illustrating a navigation map displayed in a user interface of an intelligent moving-assistance apparatus during one exemplary navigation environment establishing step.
Figure 14:
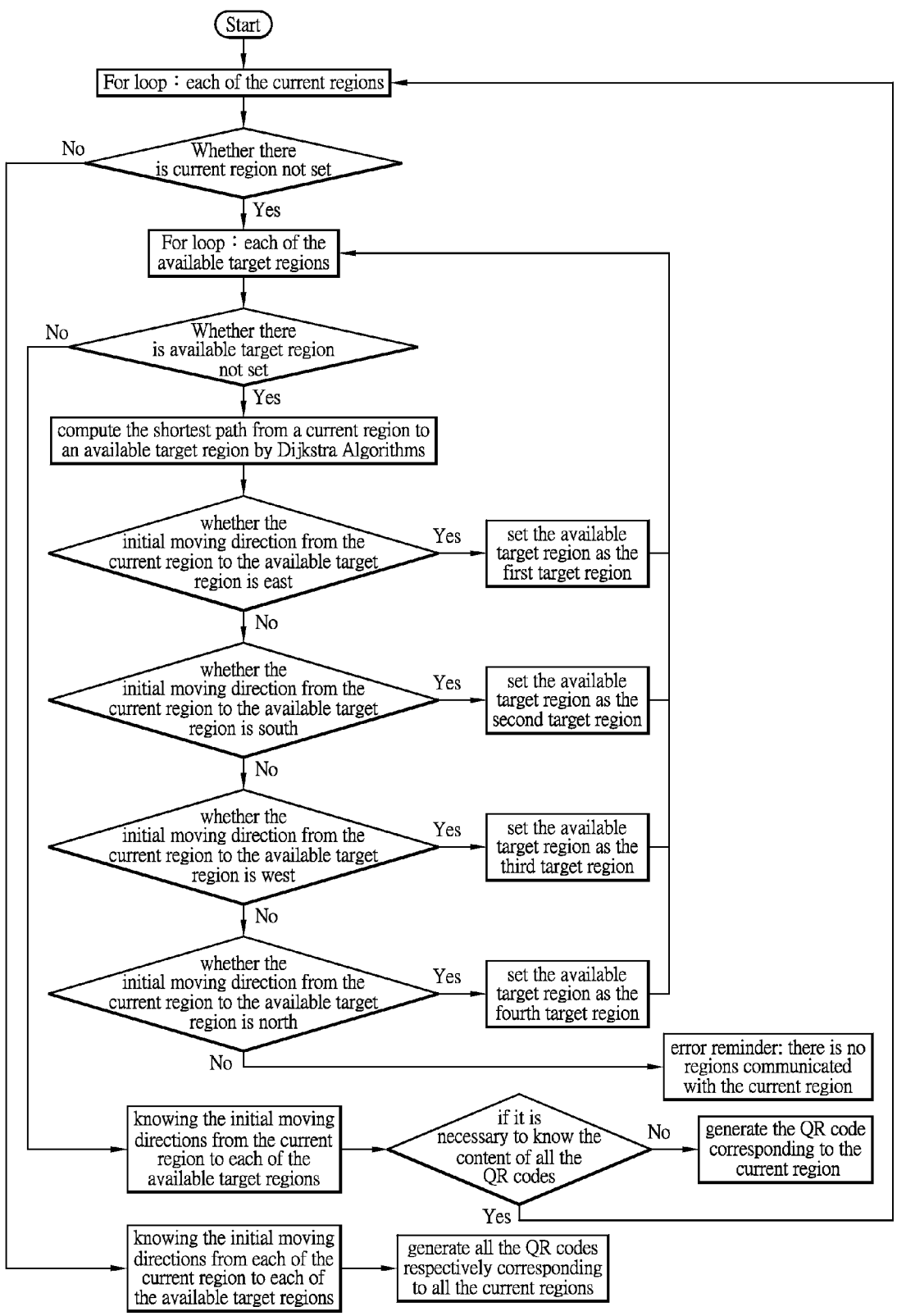
FIG. 14 is a flow chart of a method of generating a navigation data in accordance with an embodiment of the present disclosure.

For example, please refer to FIG. 13, which is a schematic view illustrating a navigation map displayed in a user interface of an intelligent moving-assistance apparatus during one exemplary navigation environment establishing step. As shown in FIG. 13, the intelligent moving-assistance apparatus 100 is currently in the toilet at first. A predetermined path such as a shortest path computed by Dijkstra Algorithms for the intelligent moving-assistance apparatus 100 to move from the toilet, the region B1, the elevator entrance, the region C2 or the region C3 to a target region such as the classroom entrance, is represent by the predetermined route as shown by arrows in the navigation map M2.

The relative direction of the intermediate target region (region B1), where the intelligent moving-assistance apparatus 100 first arrive according to the predetermined path from the toilet to the classroom entrance, with respect to the toilet is west. That is. The initial moving direction from the toilet to the classroom entrance is west. The content of the image identification tag 200 placed in the toilet includes the initial moving direction from the toilet to the classroom entrance, which is west.

The relative direction of the intermediate target region (the elevator entrance), where the intelligent moving-assistance apparatus 100 first arrive according to the predetermined path from the Region B1 to the classroom entrance, with respect to the elevator entrance is south. That is. The initial moving direction from the Region B1 to the classroom entrance is south. The content of the image identification tag 200 placed in the Region B1 includes the initial moving direction from the Region B1 to the classroom entrance, which is south.

The content of the image identification tag 200 placed in the elevator entrance includes the initial moving direction from the elevator entrance to the classroom entrance, which is east. The content of the image identification tag 200 placed in the Region C2 includes the initial moving direction of from Region C2 to the classroom entrance, which is south. The content of the image identification tag 200 placed in the Region C3 includes the initial moving direction from the Region C3 to the classroom entrance, which is east.

According to the content of the image identification tag 200 placed in the toilet, the intelligent moving-assistance apparatus 100 can firstly be guided and move toward west to arrive Region B1. Then, according to the content of the image identification tag 200 placed in Region B1, the intelligent moving-assistance apparatus 100 can be guided and move toward south to arrive the elevator entrance. Subsequently, according to the content of the image identification tag 200 placed in the elevator entrance, the intelligent moving-assistance apparatus 100 can be guided and move toward east to arrive Region C2. Then, according to the content of the image identification tag 200 placed in Region C2, the intelligent moving-assistance apparatus 100 can be guided and move toward south to arrive Region C3. Finally, according to the content of the image identification tag 200 placed in Region C3, the intelligent moving-assistance apparatus 100 can be guided and move toward east to arrive the classroom entrance. Therefore, according to the content of the image identification tags 200 placed in the regions R of the movement area 300, the intelligent moving-assistance apparatus 100 can be sequentially guided to reach the classroom entrance.

It is worth noting that, the content of each of the image identification tags 200 can include the initial moving direction from the current region to each of the available target regions. For example, in the instant embodiment in FIG. 13, the content of the image identification tag 200 placed in the elevator entrance can include the initial moving direction from the elevator entrance to each of the available target regions. Specifically, the content of the image identification tag 200 placed in the elevator entrance includes the initial moving direction to the Region C2, the initial moving direction to Region C3, and the initial moving direction to the classroom entrance, which are east. In addition, the content of the image identification tag 200 placed in the elevator entrance includes the initial moving direction to the Region B3 and the initial moving direction to the office entrance, which are south. Further, the content of the image identification tag 200 placed in the elevator entrance includes the initial moving direction to the Region B1 and the initial moving direction to the toilet, which are north.

In the navigation environment establishing method for an intelligent moving-assistance apparatus 100 in the instant disclosure, a navigation data can be generated in accordance with the above-mentioned rules and merit for navigating an intelligent moving-assistance apparatus 100. To put it concretely, a navigation data can be generated according to the navigation map M2, and the content of the navigation data includes a current region, a first target region, a second target region, a third target region, and a fourth target region.

The first target region is one of the regions R, and the region R where the intelligent moving-assistance apparatus 100 first arrive when moving from the current region to the first target region according to a predetermined path is in a first direction with respect to the current region. The second target region is one of the regions R, and the region R where the intelligent moving-assistance apparatus 100 first arrive when moving from the current region to the second target region according to a predetermined path is in a second direction with respect to the current region.

The third target region is one of the regions R, and the region R where the intelligent moving-assistance apparatus 100 first arrive when moving from the current region to the third target region according to a predetermined path is in a third direction with respect to the current region. The fourth target region is one of the regions R, and the region R where the intelligent moving-assistance apparatus 100 first arrive when moving from the current region to the fourth target region according to a predetermined path is in a fourth direction with respect to the current region.

It is worth noting that, the content of the navigation data in corresponding to a current region may include only one first target region, one second target region, one third target region, or one fourth target region in addition to the current region. Furthermore, the content of the navigation data in corresponding to a current region may include more than one first target region, one second target region, one third target region, or one fourth target region.

Please refer again to FIG. 13. For example, the first direction can be east, and the second direction can be south, the third direction can be west, and the fourth direction can be north. In the instant embodiment in FIG. 13, the content of the navigation data in corresponding to the elevator entrance includes the current region, three first target regions, two second target regions, and two fourth target regions, and includes no third target region. The current region is the elevator entrance. The three first target regions are Region C2, Region C3 and the classroom entrance. The two second target regions are Region B3 and the office entrance. The two fourth target regions are Region B1 and the toilet.

Please refer to FIG. 15, which is a flow chart of a method of generating a navigation data in accordance with an embodiment of the present disclosure. In one exemplary embodiment, the content of the navigation data can be determined by the process utilizing two loops for computing as shown in the FIG. 15. Furthermore, the predetermined path can be the shortest path computed by Dijkstra Algorithms, and the intelligent moving-assistance apparatus 100 can be guided in the first or the third direction prior to the second or the fourth direction according to the predetermined path, if there is more than one shortest path.

After the navigation data is generated, the navigation data is recorded into an image identification tag 200. For example, the navigation data can be transferred to a QR code 210 through the googleapis service of Google, and then printed out the QR code 210 to form the image identification tag 200. Lastly, the image identification tag 200 can be placed in the corresponding current region.

Attention is again invited to FIG. 1 and FIG. 2A. The intelligent moving-assistance apparatus 100 is for moving in a movement area 300 according to a plurality of image identification tags 200 placed therein, and the content of each of the image identification tags 200 including a plurality of location information. The intelligent moving-assistance apparatus 100 includes a mobile device 110, a photographic unit 120, and a control unit 130. The mobile device 110 is for carrying a user. In the instant disclosure, the mobile device 110 is implemented to a wheel chair and includes a chassis 111, a chair 112, and a plurality of wheels 113.

The photographic unit 120 is disposed on the mobile device 110 for capturing the image identification tags 200. For example, the photographic unit 120 can capture optical image data such as reflective light image data or transmitted light image data, transform the data captured to electrical signal to store the data in the memory. The photographic unit 120 can be portable or fixed to the mobile device 110 and have a function range, within which the image identification tags 200 can be captured by the photographic unit 120.

The control unit 130 is disposed on the mobile device 110. The control unit 130 can identify the current region, where the intelligent moving-assistance apparatus 100 currently is, according to the content of the image identification tag 200 currently captured by the photographic unit 120. In addition, the control unit 130 can determine an intermediate target region, where the intelligent moving-assistance apparatus 100 first arrive according to a predetermined path to reach a target region, according to the content of the image identification tag 200 currently captured by the photographic unit 120 to control the mobile device 110 to move to the immediate target region R.

Specifically, the control unit 130 can determine at least one available target region, where the intelligent moving-assistance apparatus 100 is able to move to according to the content of the image identification tag 200 currently captured by the photographic unit 120. The user can firstly determine a target region, which is the destination of the intelligent moving-assistance apparatus 100, by selecting from the at least one available target region or inputting information to the control unit 130. Then, the control unit 130 can determine the intermediate target region to the target region according to the content of the image identification tag 200 currently captured.

In the instant embodiment, the intelligent moving-assistance apparatus 100 further includes a display unit 150. The display unit 150 is disposed on the mobile device 110 and electrically connected to the control unit 130 for displaying a user interface 151 for the user to determine the target region. Moreover, the user can control the movement of the mobile device 110 through the user interface 151.

Figure 5:
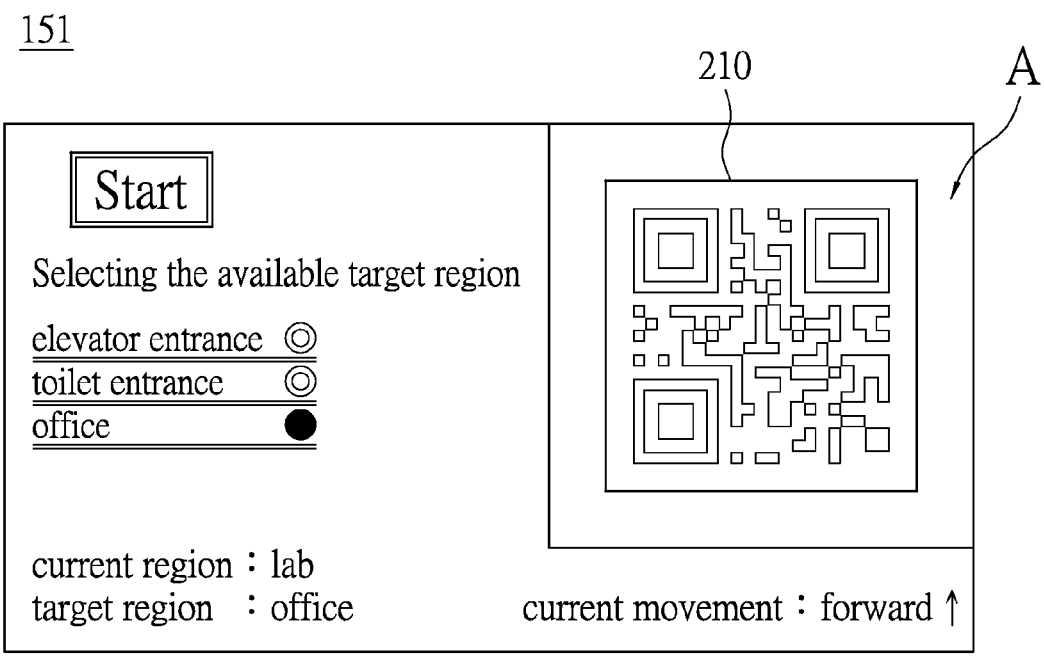
FIG. 5 is a schematic view illustrating a user interface of an intelligent moving-assistance apparatus in accordance with an embodiment of the present disclosure.
Figure 6:
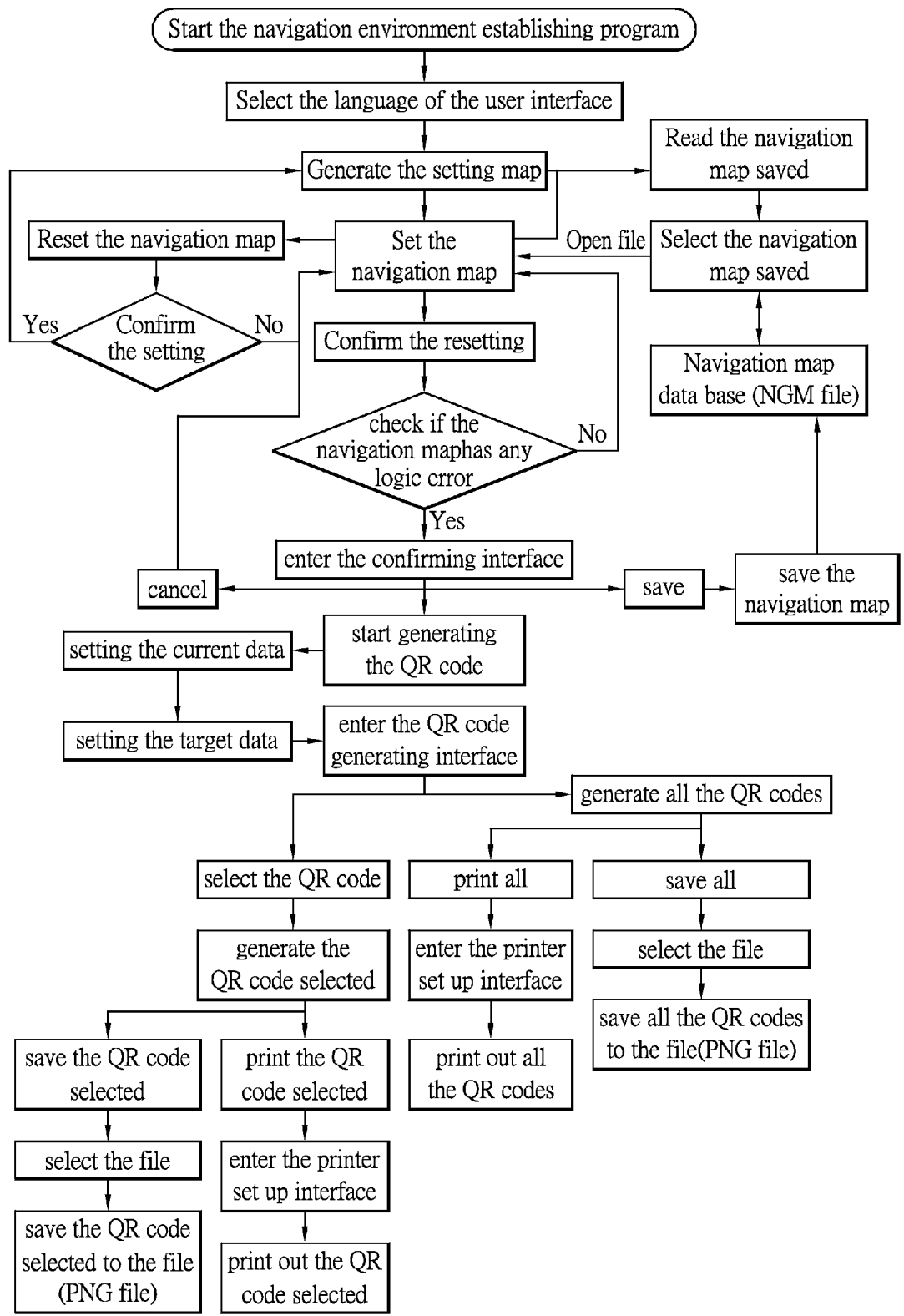
FIG. 6 is a flow chart of a navigation environment establishing method in accordance with an embodiment of the present disclosure.

Please refer to FIG. 5, which is a schematic view illustrating a user interface of an intelligent moving-assistance apparatus in accordance with an embodiment of the present disclosure. The user interface 151 includes a captured image window A in which the image captured such as the QR code 210 is displayed. The current region identified and the available target regions determined by the control unit 130 according to the QR code 210 currently captured are display on the user interface 151. In addition, the user can select one of the available target regions as the target region through the user interface 151, and the target region determined by the user is displayed on the user interface 151. As shown in the FIG. 5, the current region is the lab, the available target regions are the elevator entrance, the toilet entrance, and the office, and target region is the office.

Consequently, the control unit 130 can control the mobile device 110 to move to the immediate target region. To put it concretely, the control unit 130 can control the motor for driving each of the Mecanum wheels 113 of the mobile device 110 to move the mobile device 110 to the immediate target region. In the instant embodiment, the intelligent moving-assistance apparatus 100 further includes an electronic compass 140. The electronic compass 140 is disposed on the mobile device 110 for determining the locality of the mobile device 110, and the control unit 130 can control the mobile device 110 to move to the immediate target region according to the locality of the mobile device 110.

Figure 2B:
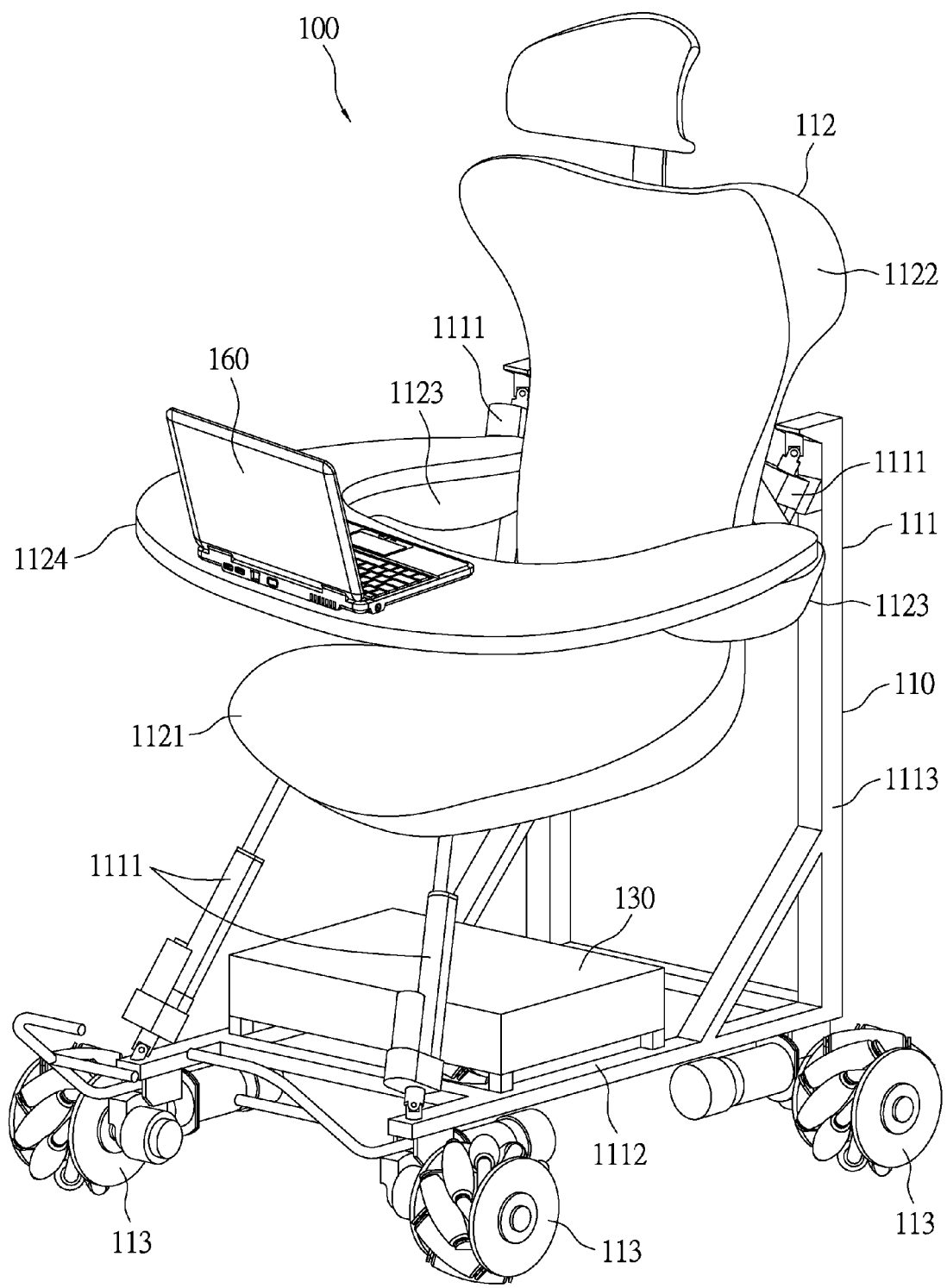
FIG. 2B is a schematic view illustrating an intelligent moving-assistance apparatus in accordance with another embodiment of the present disclosure.

Attention is now invited to FIG. 2B, which is a schematic view illustrating an intelligent moving-assistance apparatus in accordance with another embodiment of the present disclosure. As shown in the FIG. 2B in the exemplary embodiment, the photographic unit 120, the control unit 130, the electronic compass 140, and the display unit 150 are integrated in a portable electronic device 160 such as a media player, a Personal Digital Assistant device, a smart phone, a notebook computer, a tablet PC or a laptop computer. The portable electronic device 160 may be provided on a removable table board 1124 of the mobile device 110.

According to the disclosed embodiment, the user can easily set up the navigation environment by the navigation environment establishing method for an intelligent moving-assistance apparatus 100. The intelligent moving-assistance apparatus 100 can be easily controlled to reach the target region through the currently captured image of the identification tags 200 placed in the movement area 300.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A navigation environment establishing method for an intelligent moving-assistance apparatus moving in a movement area having a plurality of regions connected to one another by a passage, the navigation environment establishing method comprising:
    setting a navigation map, the content of the navigation map including the relative locality of the regions with respect to one another, the navigation map is formed with a plurality of stops and a plurality of channels connected between the stops, wherein the stops includes a plurality of navigation stops and at least one assistant navigation stop, the navigation stops respectively indicate the regions, the assistant navigation stop indicates a turning point or a branching point of the passage, and the channels each indicate one of the straight sections of the passage;
    setting a current data indicating a current region, which is one of the regions where the intelligent moving-assistance apparatus currently is;
    setting at least one target data indicating an available target region, which is one of the regions where the intelligent moving-assistance apparatus is able to move to;
    generating a navigation data according to the navigation map, the current data, and the target data, the content of the navigation data including the current region; and
    a first target region, which is one of the regions, wherein the region where the intelligent moving-assistance apparatus first arrive when moving from the current region to the first target region according to a predetermined path is in a first direction with respect to the current region;
    recording the navigation data into an image identification tag; and
    placing the image identification tag in the current region.

2. The navigation environment establishing method of claim 1, wherein the content of navigation data further includes a second target region, which is one of the regions, wherein the region where the intelligent moving-assistance apparatus first arrive when moving from the current region to the second target region according to a predetermined path is in a second direction with respect to the current region.

3. The navigation environment establishing method of claim 2, wherein the content of navigation data further includes a third target region, which is one of the regions, wherein the region where the intelligent moving-assistance apparatus first arrive when moving from the current region to the third target region according to a predetermined path is in a third direction with respect to the current region.

4. The navigation environment establishing method of claim 3, wherein the content of navigation data further includes a fourth target region, which is one of the regions, wherein the region where the intelligent moving-assistance apparatus first arrive when moving from the current region to the fourth target region according to a predetermined path is in a fourth direction with respect to the current region.

5. The navigation environment establishing method of claim 1, wherein the content of the navigation map further includes the name of each of the regions and whether every two of the neighboring regions are communicated with each other.

6. The navigation environment establishing method of claim 1, wherein the stops of the navigation map are arranged in a matrix.

7. The navigation environment establishing method of claim 1, further including checking whether the navigation map includes more than one stop indicating the available target region.

8. The navigation environment establishing method of claim 1, further including checking whether the navigation map includes more than one stop indicating the same region.

9. The navigation environment establishing method of claim 1, wherein further including checking whether each of the stops is connected to at least one of the rest of the stops.

10. An intelligent moving-assistance apparatus for moving in a movement area according to a plurality of image identification tags placed therein, the movement area having a plurality of regions connected to one another by a passage, the content of each of the image identification tags including a plurality of location information, the intelligent moving-assistance apparatus comprising:
a mobile device for carrying a user;
a photographic unit disposed on the mobile device, for capturing the contents of the image identification tags; and
a control unit disposed on the mobile device, wherein the control unit, according to the content of the image identification tag currently captured by the photographic unit, identifies a current region, where the intelligent moving-assistance apparatus currently is, and determines an intermediate target region, where the intelligent moving-assistance apparatus first arrive according to a predetermined path to reach a target region, according to a navigation map to control the mobile device to move to the immediate target region;
wherein the navigation map are formed with a plurality of stops and a plurality of channels connected between the stops, wherein the stops includes a plurality of navigation stops and at least one assistant navigation stop, the navigation stops respectively indicate the regions, the assistant navigation stop indicates a turning point or a branching point of the passage, and the channels each indicate one of the straight sections of the passage.

11. The intelligent moving-assistance apparatus of claim 10, wherein the control unit determines at least one available target region according to the content of the image identification tag currently captured by the photographic unit.

12. The intelligent moving-assistance apparatus of claim 10, further comprising:
an electronic compass disposed on the mobile device, for determining the locality of the mobile device, wherein the control unit control the mobile device to move to the immediate target region according to the locality of the mobile device;
a display unit, disposed on the mobile device and electrically connected to the control unit, for displaying a user interface for the user to determine the target region and control the movement of the mobile device; and
wherein the photographic unit, the control unit, and the electronic compass are integrated in a portable electronic device.

13. The intelligent moving-assistance apparatus of claim 10, wherein each of the image identification tags is made of paper having a corresponding QR code printed thereon.

14. A navigation environment establishing method for an intelligent moving-assistance apparatus moving in a movement area having a plurality of regions connected to one another by a passage, the navigation environment establishing method comprising:
setting a navigation map, the content of the navigation map including the relative locality of the regions with respect to one another, the navigation map are formed with a plurality of stops and a plurality of channels connected between the stops, wherein the stops includes a plurality of navigation stops and at least one assistant navigation stop, the navigation stops respectively indicate the regions, the assistant navigation stop indicates a turning point or a branching point of the passage, and the channels each indicate one of the straight sections of the passage;
setting a current data indicating a current region, which is one of the regions where the intelligent moving-assistance apparatus currently is;
setting at least one target data indicating an available target region, which is one of the regions where the intelligent moving-assistance apparatus is able to move to;
generating a navigation data according to the navigation map, the current data, and the target data, the content of the navigation data including
a current stop indicating the current region; and
a first target stop, which is one of the stops, wherein the stop most adjacent to the current strop in a predetermined path from the current stop to the first target stop is in a first direction with respect to the current stop;
recording the navigation data into an image identification tag; and
placing the image identification tag in the current region.

15. The navigation environment establishing method of claim 14, wherein the content of navigation data further includes a second target stop, which is one of the stops, wherein the stop most adjacent to the current strop in a predetermined path from the current stop to the second target stop is in a second direction with respect to the current stop.

16. The navigation environment establishing method of claim 15, wherein the content of navigation data further includes a third target stop, which is one of the stops, wherein the stop most adjacent to the current strop in a predetermined path from the current stop to the third target stop is in a third direction with respect to the current stop.

17. The navigation environment establishing method of claim 16, wherein the content of navigation data further includes a fourth target stop, which is one of the stops, wherein the stop most adjacent to the current strop in a predetermined path from the current stop to the fourth target stop is in a fourth direction with respect to the current stop.

\* \* \* \* \*